US006779052B2

(12) United States Patent
Hatano (10) Patent No.: US 6,779,052 B2
(45) Date of Patent: Aug. 17, 2004

(54) ELECTRONIC APPARATUS, SYSTEM AND METHOD FOR CONTROLLING COMMUNICATION AMONG DEVICES COUPLED THROUGH DIFFERENT INTERFACES

(75) Inventor: Ken Hatano, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 256 days.

(21) Appl. No.: 09/893,484

(22) Filed: Jun. 29, 2001

(65) Prior Publication Data

US 2002/0002645 A1 Jan. 3, 2002

(30) Foreign Application Priority Data

Jun. 30, 2000 (JP) ........................................ 2000-197575

(51) Int. Cl.[7] .............................................. G06F 13/00
(52) U.S. Cl. .............................. 710/33; 710/5; 710/73; 712/225
(58) Field of Search ........................... 710/5, 8, 10–11, 710/15, 18, 33, 36, 72–74, 107, 129, 303, 14; 712/225; 709/230; 711/4

(56) References Cited

U.S. PATENT DOCUMENTS

| | | | | |
|---|---|---|---|---|
| 5,136,504 A | * | 8/1992 | Fushimoto | ..................... 700/90 |
| 5,761,460 A | * | 6/1998 | Santos et al. | ................. 710/129 |
| 5,898,891 A | * | 4/1999 | Meyer | ............................ 710/33 |
| 5,948,092 A | * | 9/1999 | Crump et al. | ................. 710/129 |
| 6,070,214 A | * | 5/2000 | Ahern | ........................... 710/128 |
| 6,173,348 B1 | * | 1/2001 | Hewitt | ........................... 710/107 |
| 6,493,783 B1 | * | 12/2002 | Kinoshita et al. | ............. 710/303 |
| 6,553,432 B1 | * | 4/2003 | Critz et al. | ..................... 710/10 |

FOREIGN PATENT DOCUMENTS

| | | |
|---|---|---|
| JP | 10-254811 | 9/1998 |
| JP | 11-175206 | 7/1999 |

* cited by examiner

*Primary Examiner*—Jeffrey Gaffin
*Assistant Examiner*—Rijue Mai
(74) *Attorney, Agent, or Firm*—Finnegan, Henderson, Farabow, Garrett & Dunner, L.L.P.

(57) ABSTRACT

An electronic apparatus, system and method are provided for controlling different types of electronic devices coupled through a serial bus. The electronic apparatus may include an Integrated Drive Electronics (IDE) port for coupling a plurality of different types of IDE devices, each having information for controlling the device, a memory, and an IEEE 1394 interface for coupling the device to another electronic apparatus, such as a personal computer (PC), through an IEEE 1394 cable. Different types of IDE devices, such as a hard-disk drive or a CD-ROM drive, may be coupled to the IDE port. The PC may read information from each IDE device, convert the information into a format defined by the IEEE 1394 standard, and store the information in a provided configuration read-only-memory (ROM). When another electronic device coupled to the IEEE 1394 bus accesses the IDE device, the information for the IDE device may be read from the configuration ROM and transmitted to the electronic device to control the respective IDE device.

11 Claims, 6 Drawing Sheets

| INPUT | OUTPUT |
|---|---|
| FEATURES | ERROR |
| SECTOR COUNT | |
| SECTOR NUMBER | |
| CYLINDER LOW | |
| CYLINDER HIGH | |
| DEVICE / HEAD | |
| COMMAND | STATUS |

|  | ATA | ATAPI |
|---|---|---|
| SECTOR COUNT | 01h | 01h |
| SECTOR NUMBER | 01h | 01h |
| CYLINDER LOW | 00h | 14h |
| CYLINDER HIGH | 00h | EBh |
| DEVICE / HEAD | 00h | 00h OR 10h |

*FIG. 6*

ELECTRONIC APPARATUS, SYSTEM AND METHOD FOR CONTROLLING COMMUNICATION AMONG DEVICES COUPLED THROUGH DIFFERENT INTERFACES

CROSS REFERENCE TO RELATED APPLICATIONS

This application claims the benefit of Japanese Patent Application No. P2000-197575, filed on Jun. 30, 2000, the disclosure of which is expressly incorporated herein by reference in its entirety.

DESCRIPTION OF THE INVENTION

1. Field of the Invention

The invention relates to an electronic apparatus, system, and method for controlling communication among devices coupled through different interfaces. More particularly, the invention relates to an electronic apparatus, system, and method for coupling different types of electronic devices through a high-speed serial bus to a personal computer.

2. Background of the Invention

A high-speed serial bus may be used to couple various electronic devices. For example, an IEEE 1394 bus may be used to couple a personal computer (PC) with digital information devices such as a digital video camera, a hard disk drive (HDD), or a magneto-optical drive. The IEEE 1394 bus may also couple a digital broadcast receiving device and a digital television.

To communicate between the PC and one or more electronic devices coupled through the IEEE 1394 serial bus, a plurality of protocols including the Serial Bus Protocol 2.0 (SBP2) and the AV/C digital interface command set (AVC), have been developed based on the IEEE 1394 serial bus standard.

Each electronic device coupled through the IEEE 1394 serial bus (hereinafter referred to as a "1394 device") may offer different functions. When a PC accesses each device coupled through the IEEE 1394 bus, it may identify the functions offered by the devices. The address space of each 1394 device includes a configuration read-only memory (ROM) that prescribes each function of the 1394 device. The PC may read the information in the configuration ROM to determine how to access the 1394 device.

The PC may read the information recorded in the configuration ROM for each device to identify each 1394 device coupled to the serial bus. When the PC recognizes a 1394 device, it may then determine available protocols for communicating with the 1394 device.

For example, if the 1394 device is a HDD device the SBP2 communication protocol may be used to control the 1394 HDD device. The SBP2 protocol may be used to exchange Small Computer System Interface (SCSI) commands between the PC and the 1394 HDD device. The configuration ROM for the 1394 HDD device may store a description that identifies functions of the device that support the SBP2 communication protocol.

A PC may enter a bus reset phase to identify variations of topology of the IEEE 1394 serial bus and node status. During the reset phase the PC may detect the configuration ROMs of each IEEE 1394 device and perform an initialization process for each 1394 device detected using one or more supported communication protocols.

An IEEE 1394//IDE conversion device may be used to couple an IDE device, such as a HDD or CD-ROM drive to the PC through the IEEE 1394 serial bus. The conversion device may determine the coupling of each IDE device to an IDE port in the conversion device. The conversion device may include a configuration ROM to store information for each IDE device as a fixed value.

Generally, all IDE devices coupled to an IDE port in the conversion device are referred to by corresponding IDE device identifiers. However, there are different communication control schemes for IDE devices. For example, devices such as HDDs and Peripheral Component Interconnect (PCI) memory cards typically communicate using the Advanced Technology Attachment (ATA) control system. Whereas devices such as CD-ROM drives and magneto-optical drives typically communicate using the ATA with Packet Interface (ATAPI) control system. Thus, the IDE devices coupled to the IDE port may use different types of control systems.

Problems may occur when a conventional conversion device stores the information for IDE devices using different control systems in the configuration ROM without regard to the different control systems used. A conventional conversion device may misidentify IDE devices coupled to the IDE port as using the same control system when IDE devices using different control systems are actually coupled to the IDE port of the conversion device.

Accordingly, conventional apparatuses and methods for communicating among 1394 devices contain serious shortcomings, even if each 1394 device may be accessed from every 1394 node coupled to the 1394 bus.

SUMMARY OF THE INVENTION

Therefore, there is a need for an apparatus, system and method to provide reliable communication and control among electronic devices coupled through different types of interfaces, while solving one or more of the above-mentioned problems and defects of a conventional apparatus and method.

The present invention includes a novel apparatus, system and method for providing reliable communications and controlling access to peripheral devices, while solving one or more of the above-mentioned problems and defects of a conventional apparatus and method. An apparatus, system, and method consistent with the present invention may control access to a particular device by selectively allowing or forbidding access to data, based on the node requesting access to the particular device.

Consistent with one aspect of the invention, an electronic apparatus is provided comprising a first communication means for communicating with a first device; a second communication means, separate from the first communication means, for communicating with a second device having first information for communication; receiving means for receiving the first information through the second communication means; memory means for storing the first information in a predetermined format; sending means for sending the first information from the memory means, through the first communication means and to the first device, in accordance with a request for the first information from the first device.

Consistent with another aspect of the invention, an electronic apparatus is provided comprising an IEEE 1394 interface for communicating with an IEEE 1394 device; an Integrated Drive Electronics (IDE) interface for coupling to a first IDE device and a second IDE device, wherein the first IDE device has first information for enabling other devices to communicate with the first IDE device, the second IDE device has second information for enabling other devices to communicate with the second IDE device, and the first IDE device and the second IDE device are detachably coupled to the IDE interface; a controller for reading the first information for the first IDE device and the second information for the second IDE device through the IDE interface; a memory for storing the first information and the second information; and logic for selectively sending either the first information or the second information, through the IEEE 1394 interface and to the IEEE 1394 device, in accordance with a request from the IEEE 1394 device.

Consistent with an aspect of the invention a system is provided comprising a first device having a first communication means that couples the first device to a second device and a second communication means, separate from the first communication means, that couples the first device to a third device, wherein the second device has first information for communicating between the second device and the third device; and the first device includes means for reading the first information through the first communication means, memory means for storing the first information, and means for transmitting the first information to the third device through the second communication means in accordance with a request for the first information by the third device.

Consistent with another aspect of the invention an electronic system is provided including a first device having a first communication means and a second communication means; a second device, coupled to the first communication means in the first device and having first information for communicating between the second device and a third device; the third device, coupled to the second communication means in the first device; wherein the first device includes means for reading the first information, a controller for converting the first information into a predetermined format that can be read by the third device; a memory for storing the first information in the predetermined format; and an interface for sending the first information from the memory to the third device through the second communication means in accordance with a request for the first information by the third device.

Consistent with an aspect of the invention, a method is provided for controlling communications between a first device and a second device, wherein the first device includes a first communication means and a second communication means, separate from the first communication means, for communicating first information with the second device, the method comprising reading the first information for communicating between the first device and the second device; converting the first information into a predetermined format associated with the second device; storing the converted information in a memory in the predetermined data format; and sending the converted information from the memory to the second device in accordance with a request from the second device through the second communication means.

Methods and system consistent with still another aspect of the invention include a conversion device that interfaces one or more peripheral devices to at least one processor using a second communication bus, the conversion device comprising a peripheral interface for coupling the conversion device to the one or more peripheral devices; a memory for storing information about the one or more peripheral devices; a controller, coupled to the peripheral interface, the memory and a serial bus interface, wherein the controller includes: logic that detects each peripheral device coupled to the peripheral interface, logic that determines a type of each detected peripheral device and stores the determined type in the memory, logic that determines a protocol for communicating with each detected peripheral device and stores the determined protocol in the memory, and logic that sends the stored information through the serial bus interface to the at least one processor, in response to a request from the at least one processor.

Specific embodiments of the invention may include an Integrated Drive Electronics (IDE) interface, IEEE 1394 interface also known as a FIREWIRE™ interface, or an Universal Serial Bus (USB) interface. Additionally, the conversion device may communicate using an Advanced Technology Attachment (ATA) protocol or an ATA with Packet Interface (ATAPI) protocol.

Additional features and advantages of the invention will be set forth in part in the description which follows, and in part will be obvious from the description, or may be learned by practice of the invention. Additional features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
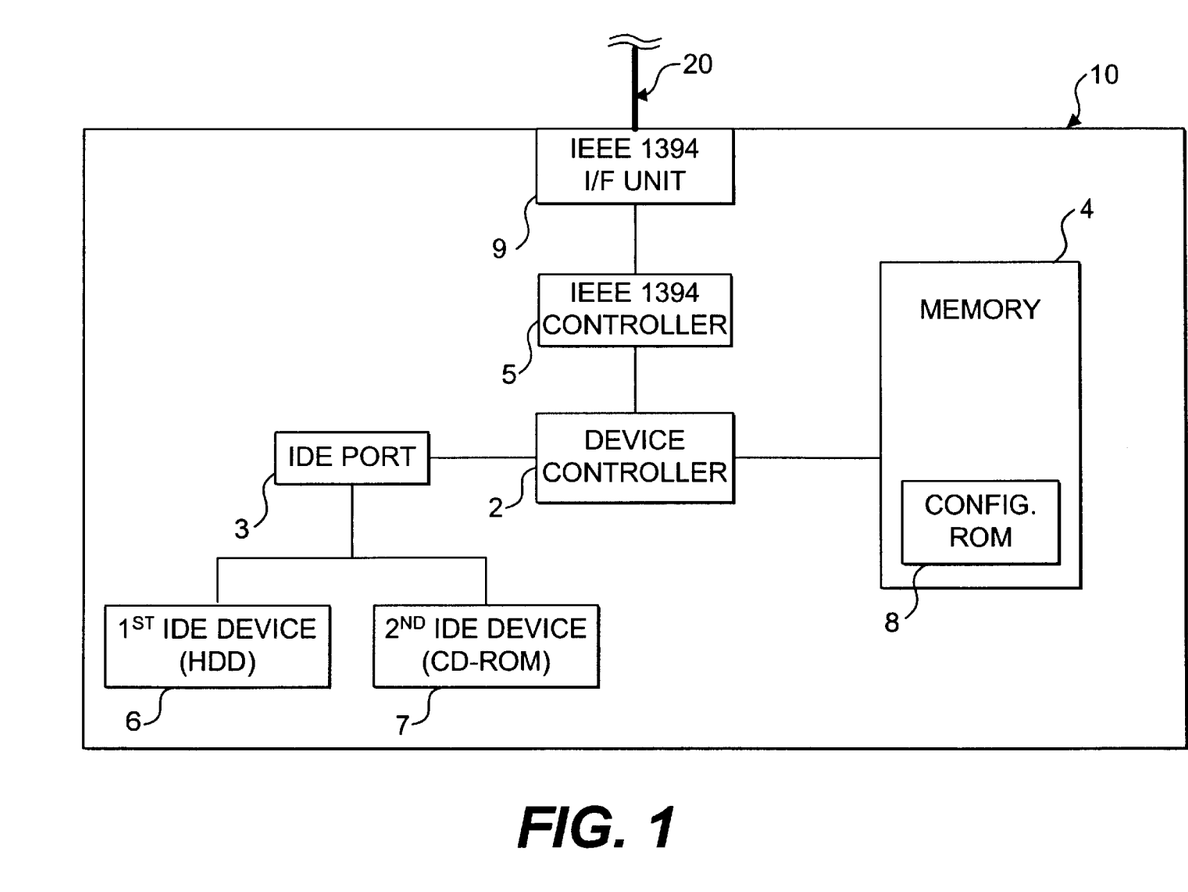
FIG. 1 is an exemplary block diagram of an IEEE 1394/IDE conversion device consistent with the invention, which may couple a personal computer to other electronic devices through an IEEE 1394 serial bus.

FIG. 1 is an exemplary block diagram illustrating an IEEE 1394/IDE conversion device 10 consistent with the present invention. The conversion device 10 includes a device controller 2 coupled to an Integrated Drive Electronics (IDE) port 3, a memory 4, and an IEEE 1394 controller 5. The IDE port 3 may be coupled to one or more IDE devices, such as a hard disk drive (HDD) device 6 and a CD-ROM device 7. The memory 4 may include various temporary data and a configuration read-only memory (ROM) 8. The configuration information is described as a "configuration ROM 8" in reference to a particular format; it does not denote that the contents of the memory 4 cannot be altered. The IEEE 1394 controller 5 may be coupled to an IEEE 1394 interface (I/F) unit 9 that interfaces the conversion device 10 to an IEEE 1394 cable 20.

The device controller 2 may wholly control operation of devices from the conversion device 10 by controlling access to the memory 4 and the IDE devices 6 and 7 coupled to the IDE port 3. Thus, the IDE port 3 may be coupled to different types of IDE devices, such as a HDD 6 device or a Peripheral Componenet Interconnect (PCI) memory card (not shown) that communicate using the Advanced Technology Attachment (ATA) control system, and a CD-ROM 7 device or magneto-optical disk (MO) device (not shown) that communicate using the ATA with Packet Interface (ATAPI) control system.

The configuration ROM 8 information may be stored at a predetermined address in the memory 4. The information may include various data for identifying each device and one or more functions and control methods for each device.

The IEEE 1394 controller 5 may direct IEEE 1394 transactions by coupling the conversion device 10 to an IEEE 1394 cable 20 through an IEEE 1394 interface unit 9 as shown in FIG. 1. Thus, the IEEE 1394 controller may provide access to the memory 4 and control of the IDE devices 6 and 7 through the IEEE 1394 interface 9.

The configuration ROM 8 may store information for each IEEE 1394 device using a predetermined format, such as the format specified in the IEEE 1394/1995 standard. The configuration ROM 8 may store information regarding supported communication command sets for each function corresponding to each device coupled to the IDE port 3. The information may be used to interface each respective device to another electronic apparatus, such as a PC, coupled to the conversion device 10 through the IEEE 1394 cable 20.

The IEEE 1394 interface unit 9 may physically couple the conversion device 10 to the IEEE 1394 cable 20 for transmitting and receiving data from an IEEE 1394 device in the other electronic apparatus under control of the IEEE 1394 controller 5. Thus, the IEEE 1394 controller 5 may direct all transactions of the conversion device 10.

Figure 2:
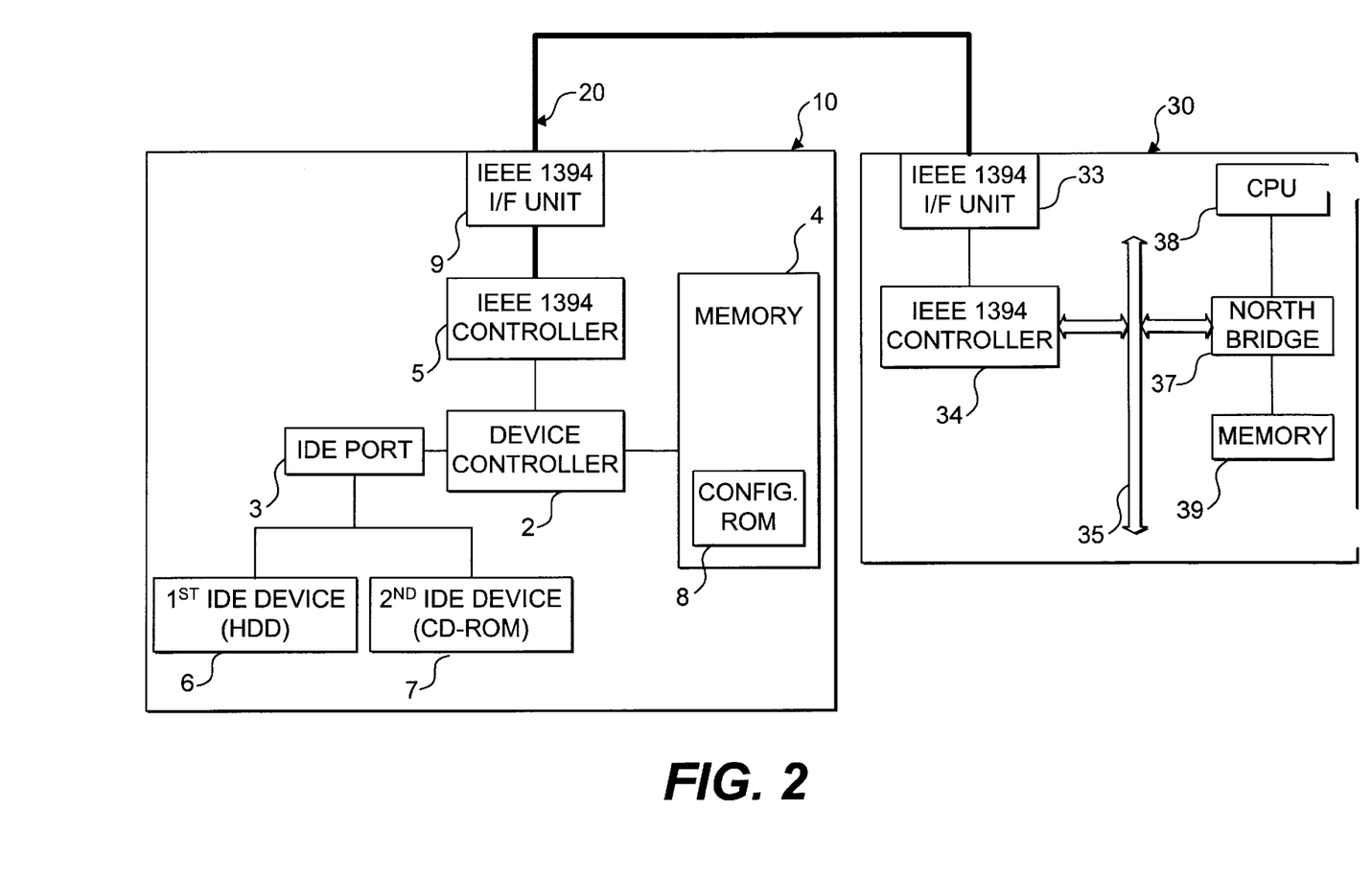
FIG. 2 is an exemplary block diagram illustrating the IEEE 1394/Integrated Drive Electronics conversion device of FIG. 1, coupled to a personal computer through an IEEE 1394 serial cable.

FIG. 2 is an exemplary block diagram illustrating the conversion device 10 of FIG. 1, coupled to a PC 30 through an IEEE 1394 serial cable 20. The PC 30 may also contain an IEEE 1394 interface unit 33 that couples the PC 30 to the IEEE 1394 serial cable 20. The interface unit 33 may be coupled to an IEEE 1394 controller 34 that controls transactions between the PC 30 and devices coupled to the serial cable 20. The IEEE 1394 controller 34 may be coupled to a north bridge 37 through a PCI bus 35. The north bridge 37 may be coupled to a CPU 38 that controls operations on the PC 30 and a memory 39 that stores executable programs and data.

When the conversion device 10 transmits data for an IDE device through the serial cable 20 to the PC 30, the IEEE 1394 controller 34 interprets the transmitted data and converts it into an appropriate form to transmit through the PCI bus 35. Thus, the PC 30 can recognize the type of IDE device coupled to the conversion device 10 and determine the appropriate command set for the IDE device by reading the information from the configuration ROM 8 in the memory 4 of the conversion device 10.

Figure 3:
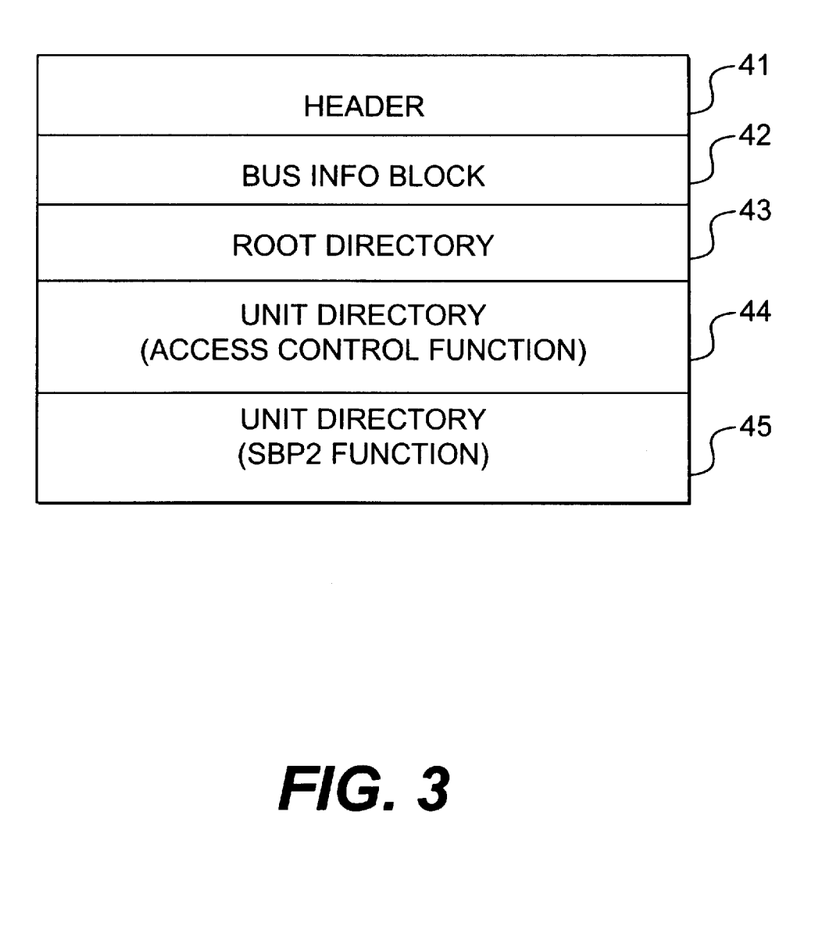
FIG. 3 is an exemplary data structure for the configuration read-only memory (ROM) in the memory of the conversion device of FIG. 1.

The configuration ROM 8 may store the information using a hierarchical data structure, such as illustrated in FIG. 3. The data structure may include a header 41, a bus information block 42, a root directory 43, a first unit directory 44, and a second unit directory 45. The header 41 may indicate the size of the data in the configuration ROM 8. The bus information block 42 may indicate defined performances corresponding to each device coupled to one of the buses. For example, the bus information block 42 may include a code to indicate that a device supports the IEEE 1394 protocol for physical communication and may further include a bit to indicate control ability of the device node. The root directory 43 may store additional information, such as a vendor identifier and address offset data for accessing data in the first unit directory 44. The first unit directory 44 may include data for recognizing one or more access control functions and utilizing one or more command sets. The second unit directory 45 may include a protocol specification identifier for specifying a particular communication protocol, such as Serial Bus Protocol 2.0 (SBP2).

Figure 4:
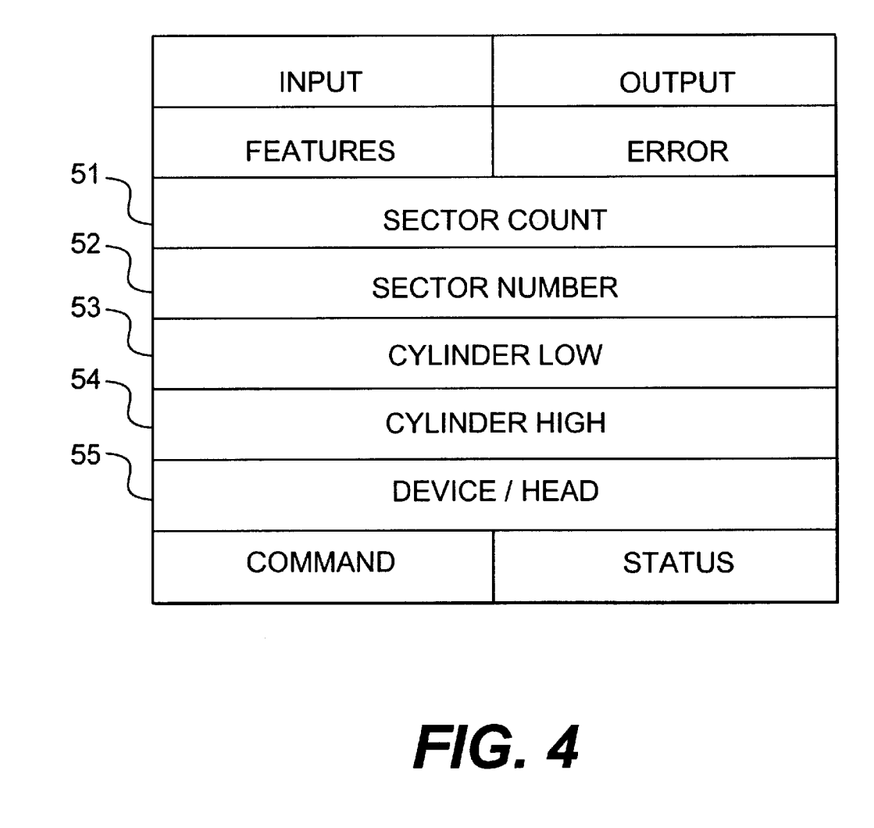
FIG. 4 is an exemplary data structure for interface registers.

Each IDE device may include a group of interface registers for responding to an access request from the device controller 2, such as shown in FIG. 4. When the device controller 2 accesses a particular IDE device, the interface registers may store input commands received from device controller 2 and the responses output in response to the input commands. FIG. 4 illustrates a set of interface registers for controlling an IDE device using ATA commands. The interface registers may include a sector count register 51, a sector number register 52, a cylinder low register 52, a cylinder high register 54, a device/head register 55, and so on.

Figure 5:
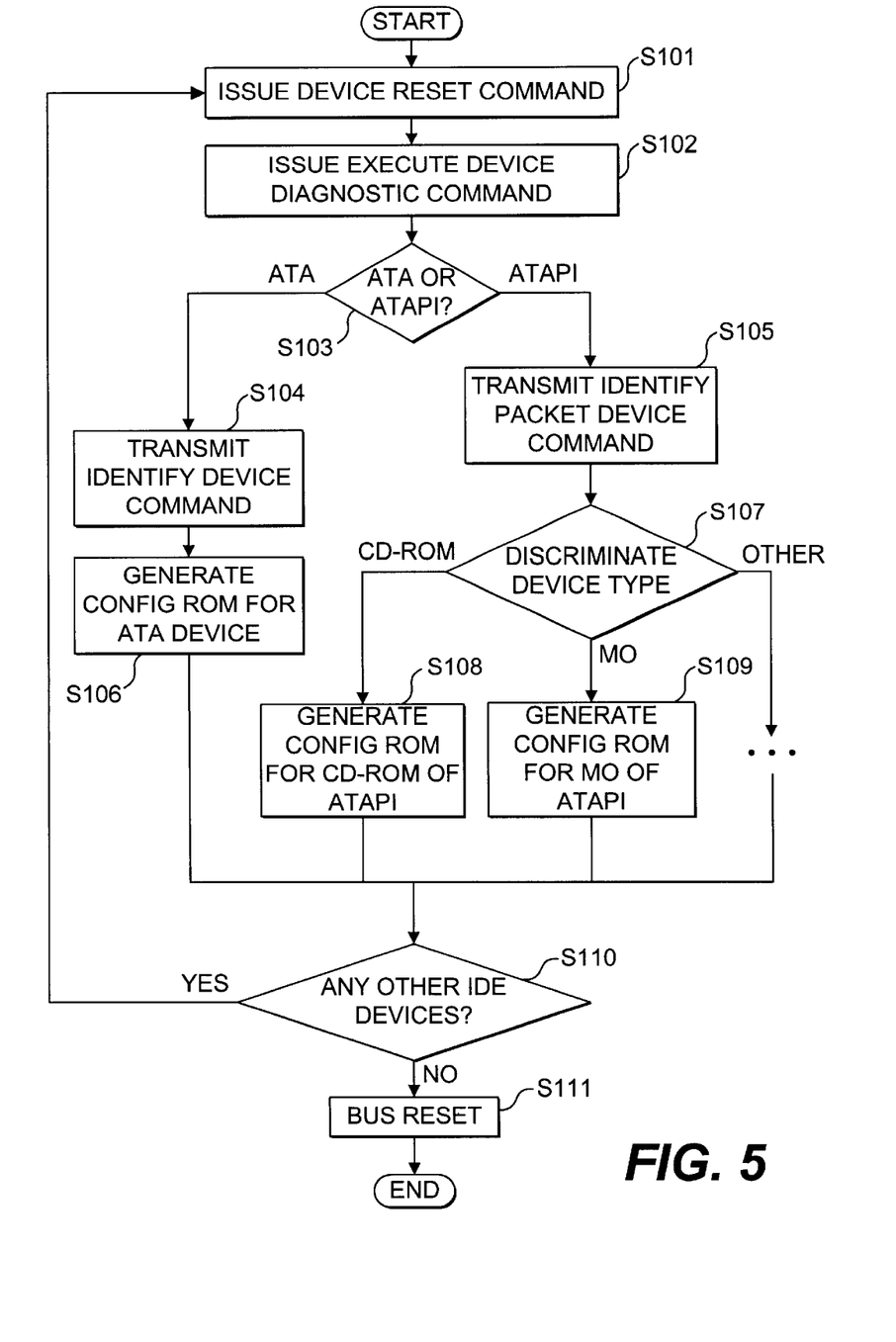
FIG. 5 is an exemplary flowchart for updating the configuration ROM.

FIG. 5 is an exemplary flowchart for a process that updates the configuration ROM 8. When a power source for the conversion device 10 is turned on, it may perform an initialization routine for the IDE devices 6 and 7. The initialization routine for the first IDE device 6 may be executed by issuing an ATA "DEVICE_RESET" command from the device controller 2 through the IDE port 3 and to the IDE device (step S101).

Then the device controller 2 may issue an ATA "EXECUTE_DEVICE_DIAGNOSTIC" command to determine whether the IDE device uses the ATA control system or the ATAPI control system (step S102).

The device controller 2 may access the interface registers of the IDE device to determine the response of the device to the ATA command. The device controller 2 may examine the response to discriminate between ATA devices and ATAPI devices (step S103).

Figure 6:
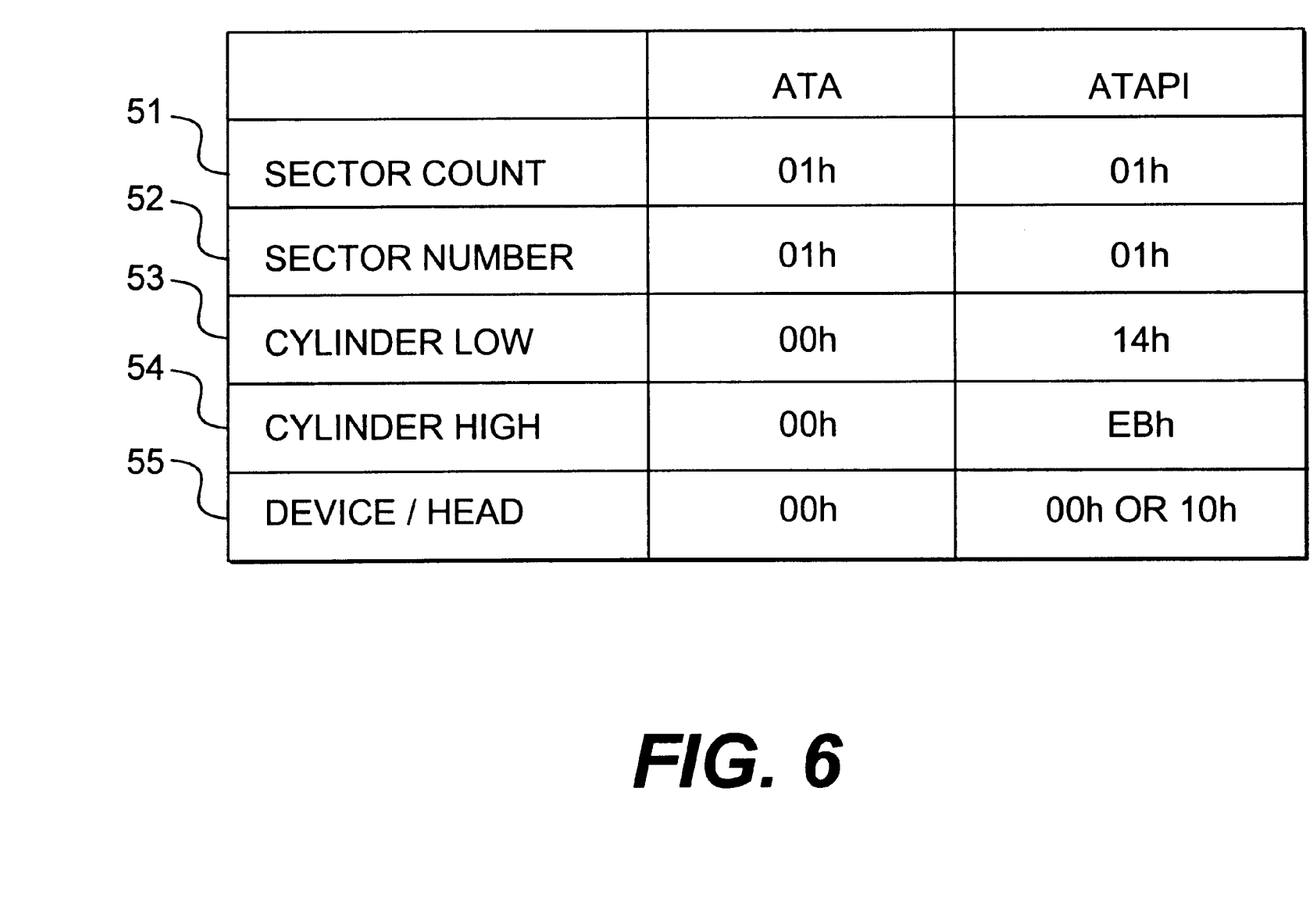
FIG. 6 shows exemplary output data for the interface registers.

FIG. 6 shows exemplary output data for the interface registers of an ATA device and an ATAPI device for an "EXECUTE_DEVICE_DIAGNOSTIC" command. Interface registers for the sector count 51, sector number 52, and device/head 55 may indicate identical values for both ATA devices and ATAPI devices. However, one may discriminate between ATA devices and ATAPI devices by examining the output values in the "Cylinder Low" register 53 and the "Cylinder High" register 54.

For example, when both the "Cylinder Low" register 53 and the "Cylinder High" register 54 indicate the same value of "00h", then the IDE device may be recognized as an ATA device. When the "Cylinder Low" register 53 and the "Cylinder High" register 54 indicate the values "14h" and "EBh" respectively, then the IDE device may be recognized as an ATAPI device.

When the IDE device is recognized as an ATA device, then the device controller 2 may issue an ATA "IDENTIFY_DEVICE" command to request additional data from the IDE device (step S104). The response from the IDE device may include information identifying the version of the ATA protocol supported, a command set type, a model name of the device, a serial number of the device, and function data for the device. The device controller 2 may store the data from the response into the configuration ROM 8 using the data structure shown in FIG. 3 (step S106).

Otherwise the IDE device may be recognized as an ATAPI device, such as a CD-ROM drive 7, a magneto-optical device, or a printer (step S103). When the device is recognized as an ATAPI device, the device controller 2 may issue an ATAPI "IDENTIFY_PACKET_DEVICE" command to request additional data from the IDE device (step S105). The device controller 2 may use the response from the IDE device to identify the device type and to characterize the device (step S107).

For example, when the device controller 2 recognizes a CD-ROM drive 7, it may create an entry in the configuration ROM 8 for the device using the data from the response (step S108). Similarly, when it recognizes a magneto-optical device, it may create an entry in the configuration ROM 8 for the device using the data from the response (step S109). Thus, the configuration ROM 8 may contain data corresponding to the respective device types for each recognized ATAPI device.

After writing the respective device data into the configuration ROM 8, the device controller 2 may determine whether there are additional IDE devices (step S110, YES). If the device controller 2 finds another IDE device, then it may repeat the repeat the process for identifying the device type of the IDE device (step S101). When all of the IDE devices have been identified by their respective device types (step S110, NO), the device controller 2 may issue a bus reset signal (step S111).

After the bus reset signal, the PC 30 may read the information from the configuration ROM 8 in the conversion device 10. The PC 30 may then use the device type information for the IDE devices coupled to the IDE port 3 to issue appropriate control commands and to access the respective IDE devices.

Other embodiments of the invention will be apparent to those skilled in the art from consideration of the specification and practice of the invention disclosed herein. The invention has been explained in view of IDE devices, but it is generally applicable to any type of electronic devices, such as plug and play devices. In addition, the invention has been explained in view of the IEEE 1394 bus standard, also known as FIREWIRE™, but it is also generally applicable to other bus standards including Universal Serial Bus (USB). It is intended that the specification and examples be considered as exemplary only, with a true scope and spirit of the invention being indicated by the following claims.

What is claimed is:

1. An electronic apparatus comprising:
   a first communication means for communicating with a first device;
   a second communication means, separate from the first communication means, for communicating with a second device having first information for communication;
   receiving means for receiving the first information through the second communication means;
   conversion means for converting the first information into a predetermined format;
   memory means for storing the first information in the predetermined format; and
   sending means for sending the first information from the memory means, through the first communication means and to the first device, in accordance with a request for the first information from the first device.

2. The electronic apparatus of claim 1, wherein the first communication means includes an 1394 interface for communicating with the first device and the second communication means includes an Integrated Drive Electronics (IDE) interface for communicating with the second device.

3. The electronic apparatus of claim 1, wherein:
   the first communication means includes an IEEE 1394 interface for communicating with the first device;
   the second communication means includes an Integrated Drive Electronics (IDE) interface for detachably coupling to the second device; and
   the conversion means converts the first information into a predetermined format defined by an IEEE 1394 standard.

4. An electronic apparatus, comprising:
   an IEEE 1394 interface for communicating with an IEEE 1394 device;
   an Integrated Drive Electronics (IDE) interface for coupling to a first IDE device and a second IDE device, wherein:
   the first IDE device has first information for enabling other devices to communicate with the first IDE device,
   the second IDE device has second information for enabling other devices to communicate with the second IDE device, and
   the first IDE device and the second IDE device are detachably coupled to the IDE interface;
   a controller for reading the first information for the first IDE device and the second information for the second IDE device through the IDE interface;
   a memory for storing the first information and the second information;
   logic for selectively sending either the first information or the second information, through the IEEE 1394 interface and to the IEEE 1394 device, in accordance with a request from the IEEE 1394 device; and
   a controller for converting the first information and the second information into a predetermined format defined by the IEEE 1394 standard.

5. A method for controlling communications between a first device and a second device, wherein the first device includes a first communication means and a second communication means, separate from the first communication means, for communicating first information with the second device, the method comprising:
   reading the first information for communicating between the first device and the second device;
   converting the first information into a predetermined format associated with the second device;
   storing the converted information in a memory in the predetermined data format; and
   sending the converted information from the memory to the second device in accordance with a request from the second device through the second communication means.

6. A conversion device that interfaces one or more peripheral devices to at least one processor using a second communication bus, the conversion device comprising:
   a peripheral interface for coupling the conversion device to the one or more peripheral devices;
   a memory for storing information about the one or more peripheral devices;
   a controller, coupled to the peripheral interface, the memory and a serial bus interface, wherein the controller includes:

logic that detects each peripheral device coupled to the peripheral interface, logic that determines a type of each detected peripheral device and stores the determined type in the memory, logic that determines a protocol for communicating with each detected peripheral device and stores the determined protocol in the memory, and logic that sends the stored information through the serial bus interface to the at least one processor, in response to a request from the at least one processor.

7. The conversion device of claim 6, wherein the peripheral interface is an Integrated Drive Electronics (IDE) interface.

8. The conversion device of claim 6, wherein the serial bus interface is an IEEE 1394 interface.

9. The conversion device of claim 6, wherein the serial bus interface is an Universal Serial Bus (USB) interface.

10. The conversion device of claim 6, wherein the protocol for communicating is an Advanced Technology Attachment (ATA) protocol.

11. The conversion device of claim 6, wherein the protocol for communicating is an Advanced Technology Attachment with Packet Interface (ATAPI) protocol.

* * * * *